UNITED STATES PATENT OFFICE.

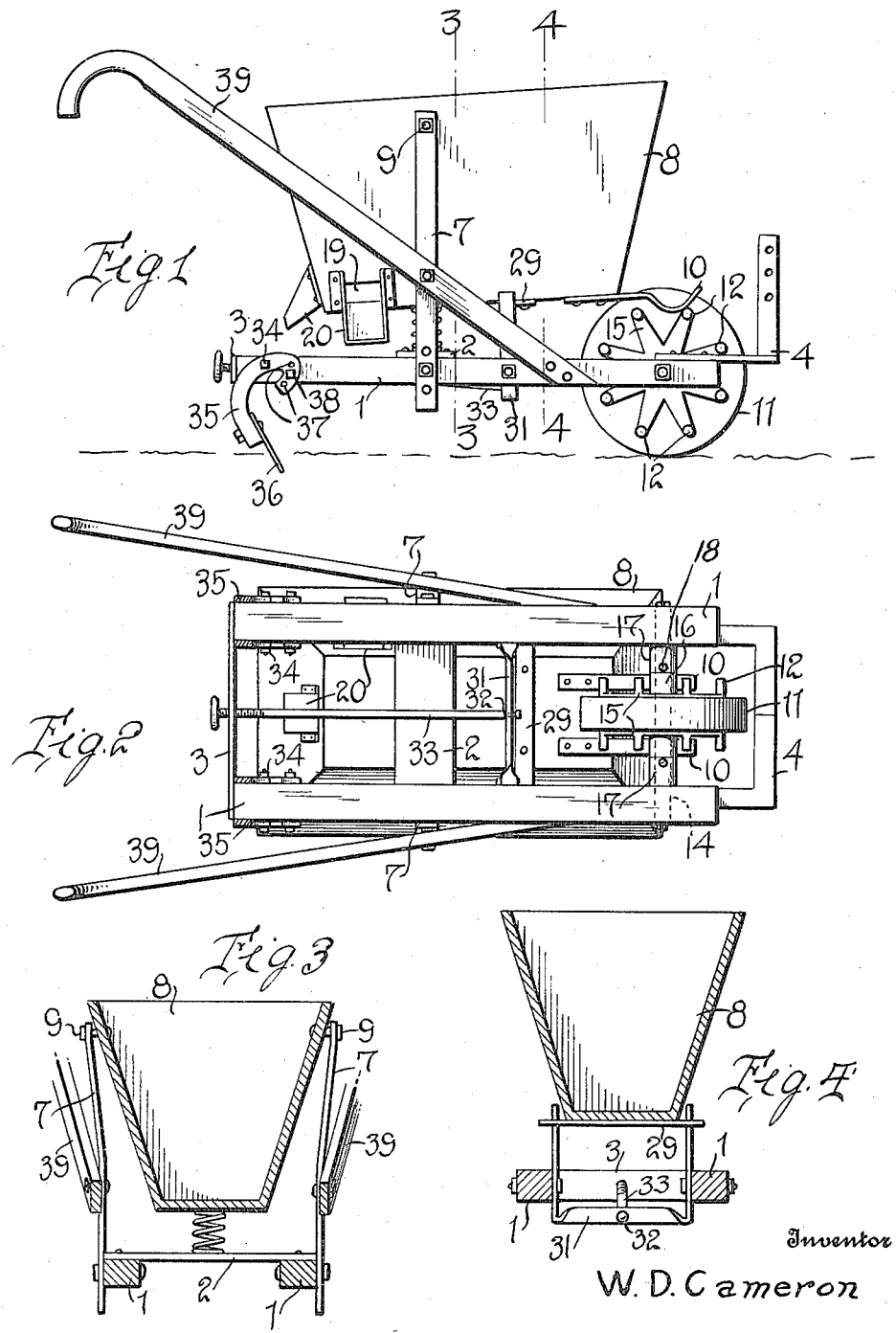

WILLIAM DON CAMERON, OF CERRO GORDO, NORTH CAROLINA.

FERTILIZER-DISTRIBUTER.

1,162,903.  Specification of Letters Patent.  Patented Dec. 7, 1915.

Application filed November 11, 1914. Serial No. 871,586.

*To all whom it may concern:*

Be it known that I, WILLIAM DON CAMERON, a citizen of the United States, residing at Cerro Gordo, in the county of Columbus and State of North Carolina, have invented certain new and useful Improvements in Fertilizer-Distributers, of which the following is a specification, reference being had to the accompanying drawings.

This invention relates to certain improvements in fertilizer distributers, and an object of the invention is to provide a novel and improved device of this general character wherein is employed a hopper from which the fertilizer is adapted to be discharged and which is caused to vibrate during the travel of the distributer.

Furthermore, it is an object of the invention to provide a distributer of this general character whereby the vibrations of the hopper may be regulated with convenience and facility.

The invention consists in the details of construction and in the combination and arrangement of the several parts of my improved fertilizer distributer whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a side elevational view of a fertilizer distributer constructed in accordance with an embodiment of my invention; Fig. 2 is a view in bottom plan of the device as illustrated in Fig. 1; Fig. 3 is a sectional view taken substantially on the line 3—3 of Fig. 1, with certain of the parts omitted; and Fig. 4 is a sectional view taken substantially on the line 4—4 of Fig. 1, with certain of the parts omitted.

As disclosed in the accompanying drawings, 1—1 denote parallel side beams tied or connected intermediate their length by the transverse beam 2 and having their rear extremities tied or connected through the medium of the metallic plate 3. The forward extremities of the beams 1 have engaged therewith suitable draft rigging 4, the details of which form no part of my present invention. At a point intermediate their lengths, the beams 1 are provided with the uprights 7 between which is positioned a hopper 8, said hopper being pivotally engaged, as at 9, with the upper extremities of the uprights. I find it in practice of advantage to have the pivotal connections 9 positioned rearwardly of the longitudinal center of the hopper 8 for a purpose which is believed to be clearly apparent to those skilled in the art to which my present invention appertains.

Projecting forwardly from the bottom of the hopper 8 are the arms 10 adapted to be positioned upon opposite sides of the supporting wheel 11 and to be engaged by the lateral projections 12 carried by the wheel 11 whereby it will be perceived that vibratory action will be imposed upon the hopper 8. The outer extremities of the arms 10 are provided with the depending rounded shoulders 10$^a$ with which the projections 12 engage, as is believed to be self-evident from the disclosure contained in the accompanying drawings.

As herein embodied, the wheel 11 is rotatably supported upon the shaft 14 mounted in the forward extremities of the beams 1 and to the opposite faces of the wheel 10 are suitably connected the stellar members 15, the extremities of the points whereof being provided with the lateral projections 12, hereinbefore referred to. Coacting with the hubs 16 of the stellar members 15 are the collars 17 fixed to the shaft 14 through the medium of the set screws 18 whereby it will be perceived that the supporting wheel 11 will be maintained in proper position upon the shaft 14.

The rear end of the hopper 8 and one side thereof in close proximity to the rear end are provided with the discharge openings 19 from which projects the chutes 20. As is believed to be self-evident, the fertilizer within the hopper 8 is adapted to be discharged upon the ground through the openings 19 over the chutes 20.

Disposed across the base of the hopper 8 adjacent the forward extremity thereof is the transverse member 29 projecting beyond opposite sides of the hopper and with such projected portions are adapted to coact the free extremities of the U-shape member or yoke 31 positioned between the beams 1 and pivotally supported thereby. The base portion of the yoke or member 31 has in swivel engagement therewith, as indicated at 32, the rod 33 disposed rearwardly of the beams 1 and in threaded engagement with the plate 3 whereby it will be perceived that upon axial rotation of the rod 33, the yoke or member 31 will be adjusted about its pivots in order to limit or regulate the movement of the forward portion of the hopper relative to the supporting wheel 11 whereby the vibrations imparted to the hopper by the lateral projections 12 may be regulated in order to meet the varying requirements of practice. Pivotally engaged, as at 34, with the rear extremity of each of the beams 1 is a plow stock 35 to the lower extremity of which a conventional sweep 36 is adapted to be secured whereby it will be perceived that my improved distributer is also provided with means whereby the fertilizer may be turned in. The upper extremity of the stock 35 is provided with a plurality of substantially vertically disposed openings 37 through which is adapted to be directed a bolt 38 also disposed through the beam 1 and whereby it will be perceived that the stock may be readily adjusted in order to maintain the sweep 36 in different positions relative to the coacting beam 1, as the necessities of practice may require. Also operatively supported by the beams 1 are the handles 39 of conventional construction and for a purpose which is believed to be apparent.

From the foregoing description, it is thought to be obvious that a fertilizer distributer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A fertilizer distributer comprising a frame, uprights carried thereby, a hopper pivotally supported between said uprights, projections extending laterally of the hopper, a yoke pivotally supported by the frame and adapted to coact with the lateral projections of the hopper for adjusting the hopper about its pivot for regulating the vibration thereof, means for imparting movement to the yoke, and means for vibrating the hopper.

2. A fertilizer distributer comprising a frame, a hopper pivotally supported thereby, a projection extending laterally from the hopper, an arm pivotally supported by the frame and adapted to coact with the lateral projection of the hopper for adjusting the hopper about its pivot for regulating the vibration thereof, means for imparting movement to the arm, and means for vibrating the hopper.

3. A fertilizer distributer comprising a frame, a hopper pivotally supported thereby, a projection extending laterally from the hopper, an arm pivotally supported by the frame and adapted to coact with the lateral projection of the hopper for adjusting the hopper about its pivot for regulating the vibration thereof, means for imparting movement to the arm, means for vibrating the hopper, and a vibratory member interposed between the frame and the hopper.

4. A fertilizer distributer comprising a frame, a hopper pivotally supported thereby, a projection extending laterally from the hopper, an arm pivotally supported by the frame and adapted to coact with the lateral projection of the hopper for adjusting the hopper about its pivot for regulating the vibration thereof, an endwise movable rod carried by the frame operatively engaged with the arm for adjusting the arm about its pivot, and means for vibrating the hopper.

5. A fertilizer distributer comprising a frame, a hopper pivotally supported thereby, a projection extending laterally from the hopper, an arm pivotally supported by the frame and adapted to coact with the lateral projection of the hopper for adjusting the hopper about its pivot for regulating the vibration thereof, a rod rotatably supported by the frame and in swiveled engagement with the arm, said rod being threaded, a plate carried by the frame with which the rod is in threaded engagement, and means for vibrating the hopper.

In testimony whereof I hereunto affix my signature in the presence of two witnesses.

WILLIAM DON CAMERON.

Witnesses:
H. S. SPRATT,
E. W. WILLIAMSON.

Copies of this patent may be obtained for five cents each, by addressing the "Commissioner of Patents, Washington, D. C."